(No Model.) 3 Sheets—Sheet 1.
J. W. VAN DYKE.
WATER TUBE STEAM BOILER.
No. 522,035. Patented June 26, 1894.
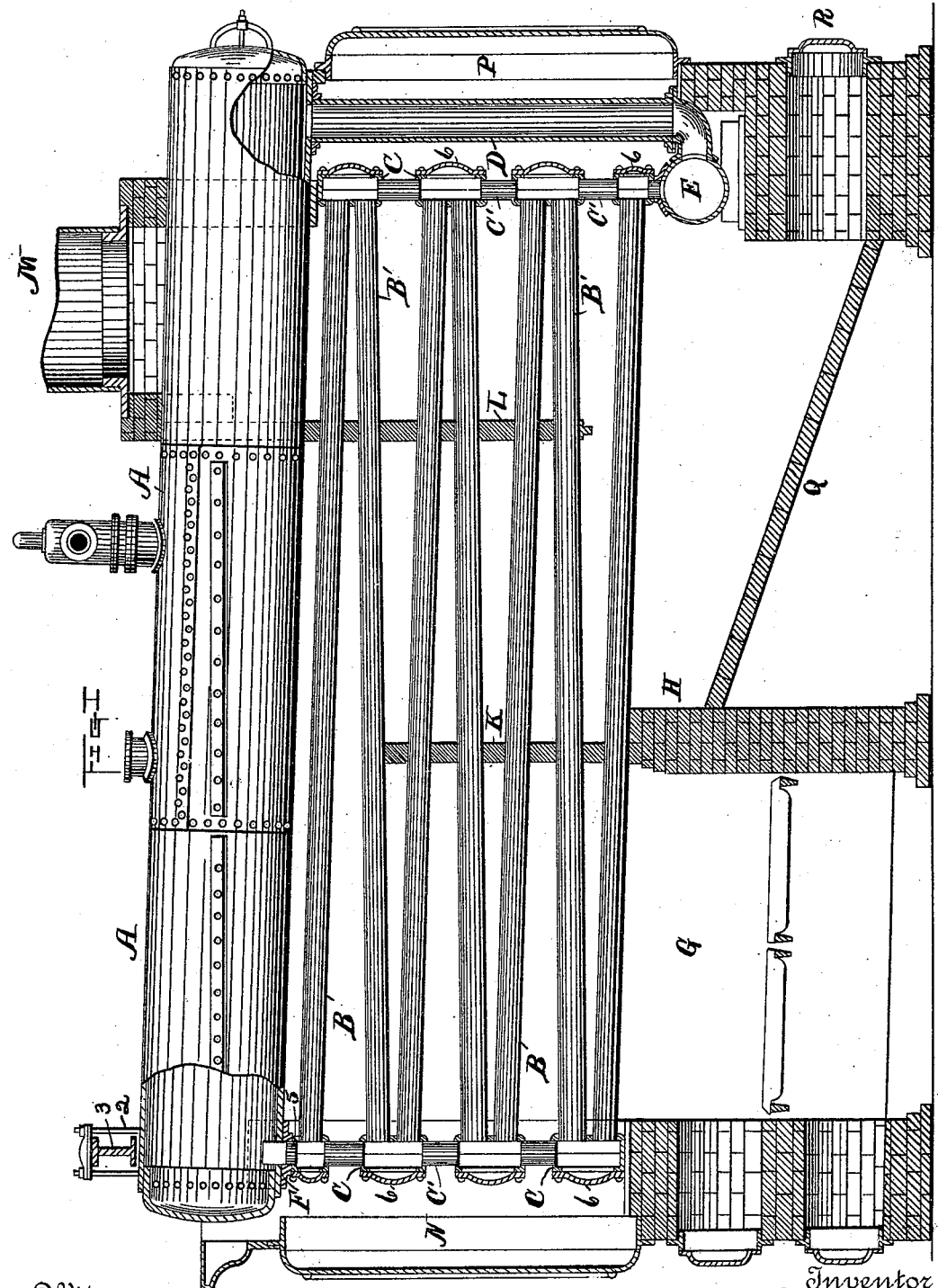
Witnesses
W. Harry Muzzy
E. S. Clark
Inventor
John W. Van Dyke
by Chas. J. Hedrick
his Attorney (No Model.) 3 Sheets—Sheet 2.
J. W. VAN DYKE.
WATER TUBE STEAM BOILER.
No. 522,035. Patented June 26, 1894.
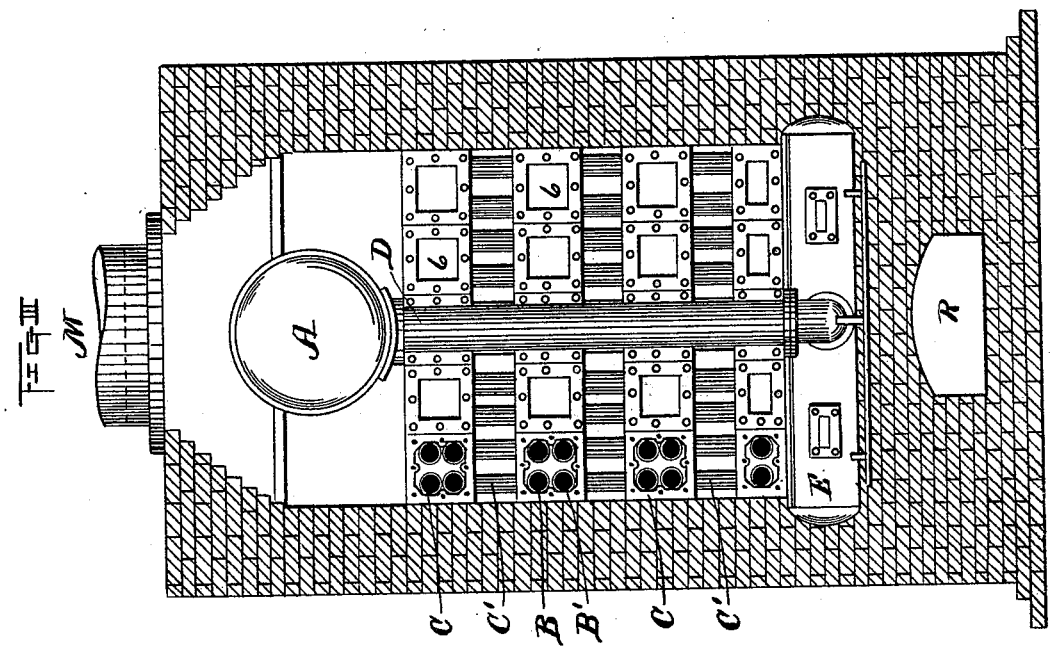
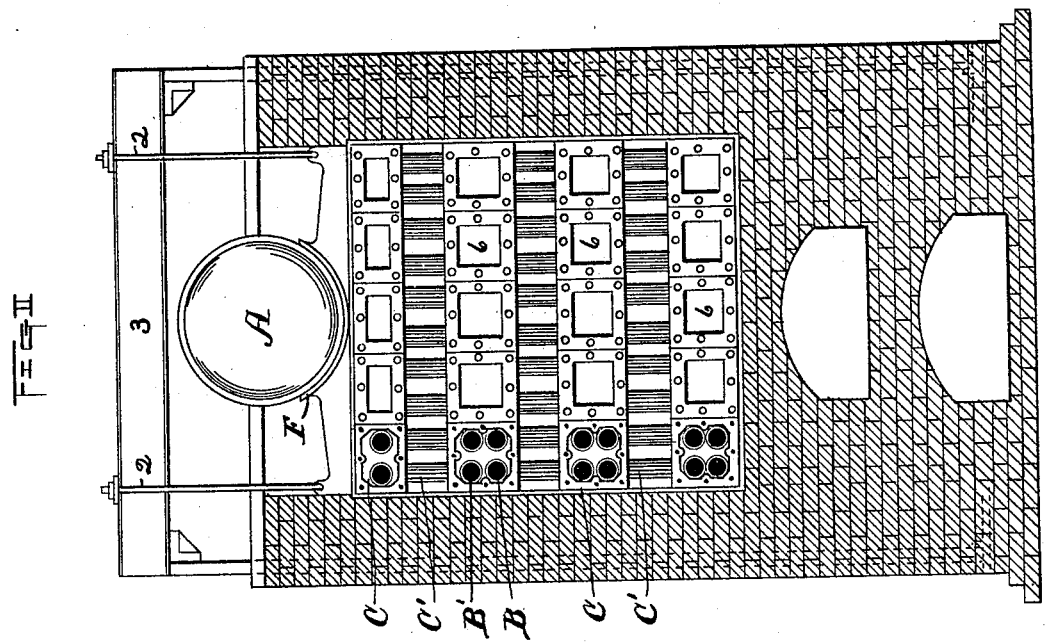

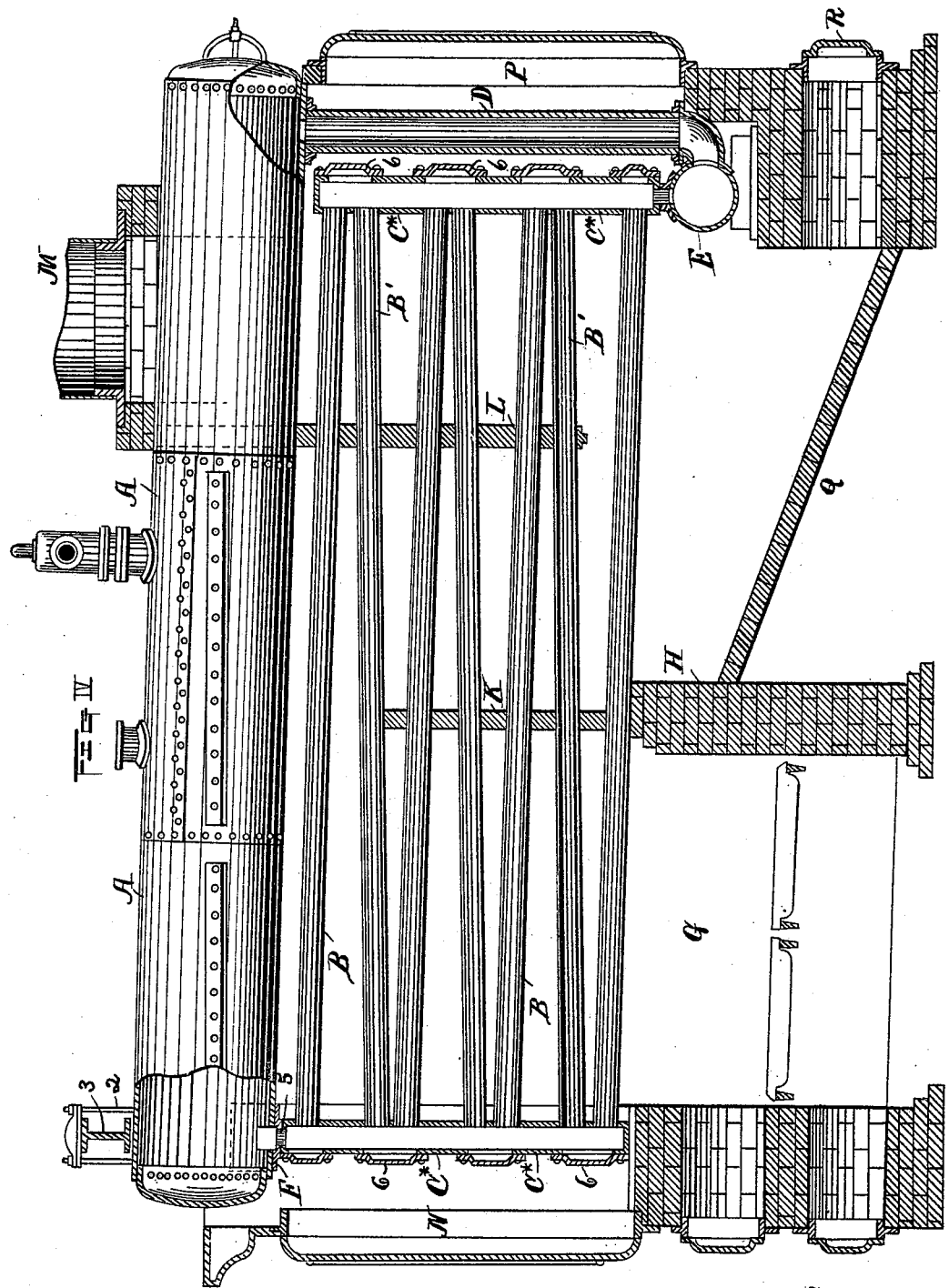

UNITED STATES PATENT OFFICE.

JOHN W. VAN DYKE, OF LIMA, OHIO.

WATER-TUBE STEAM-BOILER.

SPECIFICATION forming part of Letters Patent No. 522,035, dated June 26, 1894.

Application filed July 20, 1893. Serial No. 481,046. (No model.)

*To all whom it may concern:*

Be it known that I, JOHN W. VAN DYKE, a citizen of the United States, residing at Lima, in the county of Allen and State of Ohio, have invented certain new and useful Improvements in Water-Tube Steam-Boilers; and I do hereby declare the following to be a full, clear, and exact description of the same.

This invention relates to steam-generating boilers in which a circulation of water is maintained through tubes exposed to the fire or products of combustion in contradistinction to fire-tube boilers in which the products of combustion are passed through flues immersed in or surrounded by the water to be heated.

In accordance with said invention a system of oppositely inclined water tubes, arranged at different levels and connected at one or both ends with headers through which extend vertical passages of a section corresponding with the water tubes, is combined with a steam and water drum elevated above and connected with the upper part of the said water tube system, and also with an independent return conduit extending from the water space of said drum to the lower part of said water tube system; so that the water tube system and the return conduit together constitute an inverted siphon which opens at both ends into the water space of the elevated drum and whose rising leg is formed of lower and higher level circulation rings closed upon themselves but communicating freely with each other and with the steam and water drum. Thus the water space of the elevated drum as well as the water tube system and return conduit being filled with water, and the boiler being heated, there is a general circulation through the whole boiler due to the greater density of the water in the return conduit and elevated drum over the fluid (consisting of more highly heated water and steam) in the water tube system, which general circulation descends from the elevated drum through the return conduit and ascends to it again through the water tube system; and in this ascending portion of the general circulation there are subordinate circulations at higher and lower levels, which may be roughly described as respectively descending through the header passages and rising through the inclined water tubes, but which intercommunicate and are influenced and modified by the pressure of the heavier water column in the return conduit and the inflow of water therefrom and by the liberation of steam at the ends of the water tubes. By means of this new combination and arrangement there are secured great heating capacity with quietness and uniformity of operation, and the avoidance of the detrimental geyser action. Further in accordance with the invention a mud drum is arranged in the independent return conduit (or conduits) before mentioned; but such arrangement while having particular advantages is not essential to the boiler with oppositely inclined water tubes below the steam and water drum and headers having vertical passages through the same and an independent return conduit.

In carrying out the invention as thus far stated, the steam and water drum may be placed level, or any suitable arrangement of the same could be employed without exceeding the limits of such invention; but a special improvement consists in a water tube boiler with independent return conduit and with or without a mud drum in said conduit in which boiler the steam and water drum is inclined downward toward the point from which the independent conduit leads to the lower part of the water tube system.

Another special improvement, which is included in this invention irrespective of the location of the mud drum and the inclined arrangement of the steam and water drum, as well as in connection with one or both these features, consists in a water tube boiler with oppositely inclined water tubes and an independent return conduit, in which boiler the headers at one or both ends having vertical passages through the same, are made flexible by being composed of box like castings connected together by tubular connections, pipes, or nipples, such boiler having the advantage of a similar one with more rigid headers in being less liable to injury from the expansions and contractions of the parts of the boiler.

The invention also comprises the particular constructions and combinations hereinafter specified.

In the accompanying drawings which form part of this specification and illustrate what is considered the best mode of carrying the invention into effect,—Figure I is a central vertical longitudinal section of a water tube boiler constructed in accordance with the invention. Figs. II and III are respectively a front and a rear elevation of the same boiler, showing the ends of the boiler with front and back plates removed and also some of the covers of the headers, and Fig. IV is a central vertical longitudinal section of a somewhat modified water tube boiler, also in accordance with the invention.

Below the water and steam drum A are the water tubes B B' oppositely inclined and arranged one above another, and connected with the headers. As shown the headers at both ends are provided with vertical through passages, formed in the boiler of Figs. I to III by the cavities of the header boxes C and the bores of the connecting nipples C' forming vertical connections between the said boxes.

In the boiler of Fig. IV the vertical through passages are formed by the cavities of the header boxes C* which extend the full height of the water tube space. A single header box of proper size could be used at each end of the water tubes. The headers at both ends open into the steam and water drum A, but only the headers at the front of the boilers are shown as opening directly into the said drum, the rear headers communicating at the top with said drum through the upper water tubes B. If desired the through passages (or through passage if a single header box were employed) could be used at one end only of the water tubes (either front or rear as preferred) and any suitable connection between the drum A and the vertical through passages (whether employed at one or at both ends of the boiler) could be adopted without exceeding the limits of the invention. There are, however, advantages in the arrangement shown of having the upper parts of the through passages (or passage) communicate with the opposite end of the steam and water drum A from that from which the water passes to the lower parts of the said passages; and while a level drum could be used, there are also advantages in the arrangement just stated in having the steam and water drum A set in an inclined position with the receiving end (at which the hot water and steam enter) higher than the discharging end (at which the water leaves the drum to pass to the lower parts of the water tube system). The lower parts of the passages which extend vertically through the headers, are connected with the steam and water drum A by the pipe D independently of the water tubes (or of most of them, for as shown the through passages of the front headers are connected with the pipe D through the lower water tubes B).

Other suitable arrangement of an independent conduit between the lower parts of the headers (direct or somewhat indirect) could be adopted for one or both ends of the boiler without exceeding the limits of the invention; there are however practical advantages in the arrangement shown.

The mud drum E is interposed between the pipe D and the water tubes, and is adapted to retain such sediment as may be carried with the water.

As shown in all the figures the adjacent water tubes in each vertical row are oppositely inclined, and this particular arrangement is advantageous as it secures the most direct circulation (although all my claims are not restricted thereto, for other arrangements are evidently possible having sufficient similarity to that shown to be within my more general claims).

In Figs. I to III the headers at each end of the oppositely inclined tubes are made flexible, or yielding under the expansions and contractions of the boiler, by being composed of box like castings C with the connecting nipples C'. The several header boxes it will be observed receive oppositely inclined water tubes B B'. As shown in these figures, moreover, the header boxes C are equal in height only to a fraction of the space for the water tubes, and they are separated from each other and held apart at a suitable distance to give the desired inclination to the said tubes by the connecting nipples C' which are made of a length suitable for that purpose. The use of this length of nipples is, however, a distinct improvement and is not essential to the formation of flexible headers. The front end of the drum A rests upon the hollow casting F from which suspension links 2 extend to the cross beam 3 supported by the vertical beams 4. There are tubular nipples 5 between the casting F and the top row of header boxes C or tops of header boxes C*. The header boxes have detachable covers or plates 6 through which access is given to the interior of said boxes and of the water tubes for cleaning purposes. It is preferred to have a number of parallel headers or boxes at each end of the water tubes, each header or box to be of a width to receive say two water tubes, as shown for the boxes C in Figs. II and III. There would thus be half as many boxes C or full height headers C* widthwise of the boiler as there are vertical ranges of water tubes.

At G is the fire chamber with bridge wall H, and K L are deflecting walls for causing the products of combustion to pass oftener over the water tubes, before they escape by the chimney M.

At N and P are frames to doors through which access is had to the boiler within.

To facilitate the discharge of ashes or mineral matter which may be carried from the fire chamber with the products of combustion, an ash collecting chamber with a sloping bottom Q is provided below the bridge wall H and below the chimney M (or chimney port), the slope inclining downward to the door R in the rear wall of the boiler casing. By the arrangement shown of deflecting walls, so that the products of combustion are deflected downward toward the said slope, the collection of mineral matter thereon is favored.

In operation the boiler is kept filled with water to a suitable level in the elevated drum A (the water tubes B B', headers C C' or C*, and return conduit D being of course filled) and the flames and products of combustion pass over the water tubes and lower part of the drum A. From the latter the water descends through the return conduit D and (after depositing any sediment which it may hold in the mud drum E) enters the lower part of the water tube system. After passing through the lowermost water tubes any steam which may be formed is liberated in the front headers to pass directly to the drum A, and the water enters the next horizontal row of oppositely inclined water tubes B' wherein it is further heated. On entering the rear headers from said tubes, the water is influenced by the pressure of the water flowing in from the return conduit D, by the difference in gravity of its own particles as the same have been more or less heated in traversing the inclined water tubes, and by the difference in density between respectively the steam and water in the pairs of water tubes B B' and the water in the corresponding parts of the rear headers; and according to the balance of these forces, the water may divide into a more highly heated portion passing upward to and through the next higher level tubes B to be still further heated and a less heated portion descending to pass again through the lowermost and next higher water tubes with fresh water from the return conduit. There is also a liberation of steam in the rear header, which passes directly upward to enter the drum A by way of the topmost water tubes.

Inasmuch as in the boilers shown the oppositely inclined water tubes B B' are connected at both ends with headers having vertical through passages, the division of the water into ascending and descending portions and the liberation of the steam may take place (as shown) at the upper end of any of the inclined water tubes B or B', except that there can be no division of water at the upper ends of the lowermost tubes by the descent of a portion of such water and when the tops of the rear headers are connected with the drum A through the topmost water tubes B there will be no liberation of steam from the water which is delivered by the next lower water tubes B' into the rear headers and which then goes with the steam through the topmost water tubes B into the drum A wherein the steam is liberated. Each inclined water tube B or B' thus makes with the oppositely inclined water tube above or below it and the corresponding portion of the rear or the front headers a circulation ring in which the water can flow round and round continuously with liberation of steam at one or both headers, but each of these circulations is constantly receiving water from a lower circulation (or from the return conduit D) and delivering water into a higher level circulation (or into the elevated drum A), the flow in each of these small circulations being influenced and the passage of water from the lower to the higher level circulations and eventually into the drum A being determined by the pressure of the water in the return conduit D and drum A, in which latter the water level is above the highest part of the water tube system.

The expression of an independent conduit or a steam and water drum in the claims hereinafter written is not to be understood as excluding from the claim a boiler with more return conduits than one, or more steam and water drums than one; nor is the expression of headers and passages to be understood as excluding the use of a header and a passage.

I claim as my invention or discovery—

1. A water tube boiler comprising in connection with an elevated steam and water drum having its lower part exposed to the fire, oppositely inclined water tubes arranged under and lengthwise of said drum, headers through which extend vertical passages corresponding in section with said tubes, and an independent return conduit from the water space of said drum, substantially as described; whereby short circulating systems are provided through said vertical passages and water tubes in addition to the general circulation through the said drum, conduit, water tubes and headers, as set forth.

2. A water tube boiler comprising in connection with a steam and water drum, oppositely inclined water tubes at different levels, the intermediate tubes being connected by passages of corresponding size at one end with the lower ends of higher and lower level tubes and at the other end with the upper ends of higher and lower level tubes, and an independent return conduit from the water space of said drum, substantially as described; whereby in addition to the general circulation through the said drum, return conduit and water tubes, a succession of short circulating systems is provided with the said intermediate tubes common to adjoining systems as a connecting link between them, as set forth.

3. A water tube boiler comprising in connection with a steam and water drum, oppositely inclined water tubes, flexible headers composed of box like castings and connecting nipples through which vertical passages extend, and an independent return conduit from the water space of said drum, substantially as described.

4. A water tube boiler comprising in connection with an elevated steam and water drum having its lower part exposed to the fire, oppositely inclined water tubes arranged under and lengthwise of said drum, headers through which extend vertical passages corresponding in section with said tubes and which open into one end of said drum, and an independent conduit returning from said drum to the bottom part of the water tube system, substantially as described.

5. A water tube boiler comprising an inclined steam and water drum, in connection with oppositely inclined water tubes, headers through which vertical passages extend and which open into the higher end of said drum, and an independent return conduit from the lower end of said drum, substantially as described.

6. A water tube boiler comprising a steam and water drum, water tubes arranged in vertical rows with the tubes in the same vertical row alternately inclined in opposite directions, headers through which vertical passages extend, and an independent return conduit, substantially as described.

7. A water tube boiler comprising a steam and water drum, header boxes, nipples between said boxes, oppositely inclined water tubes connected with each of said boxes, and an independent return conduit, the nipples being of a length to separate said boxes from each other where two oppositely inclined water tubes are widely separated, substantially as described.

8. A water tube boiler comprising a steam and water drum, oppositely inclined water tubes, headers with passages through the same at both ends of the said tubes, and an independent return conduit, the headers at one end of said tubes opening more directly into one end of the said drum, and the headers at the opposite end of said tubes communicating more directly with the return conduit which leads from the opposite end of said drum, substantially as described.

9. A water tube steam boiler comprising oppositely inclined water tubes arranged at different levels, and headers with which said water tubes are connected and through which extend vertical passages corresponding in section with said tubes, in combination with a steam and water drum elevated above and connected with the upper part of said system of water tubes and headers, and an independent return conduit from the water space of said drum to the lower part of said water tube system; the said water tubes and headers forming lower and higher level circulation rings closed on themselves but communicating with each other and constituting together the rising leg of an inverted siphon which opens at both ends into the water space of said drum and whose descending leg is constituted by the said return conduit; substantially as described.

In testimony whereof I have affixed my signature in presence of two witnesses.

JOHN W. VAN DYKE.

Witnesses:
SETH S. WHEELER,
CHARLES D. BALLIET.